Feb. 22, 1949.  M. L. BENJAMIN ET AL  2,462,155

CHUCK

Filed Dec. 5, 1945

INVENTORS
MILTON L. BENJAMIN and
FRANKLYN E. WINNEN
BY
Oberlin & Limbach
ATTORNEYS Patented Feb. 22, 1949

2,462,155

UNITED STATES PATENT OFFICE 2,462,155

CHUCK

Milton L. Benjamin, Shaker Heights, and Franklyn E. Winnen, Cleveland, Ohio; said Winnen assignor to said Benjamin Application December 5, 1945, Serial No. 632,893

2 Claims. (Cl. 279—4)

The present invention relating as indicated to chucks has more particular regard to chucks of the type in which a tap or like tool, or workpiece, is gripped by a contractible and expansible collet. Still more particularly, the invention contemplates the provision of means for operating such a chuck by air or equivalent fluid under pressure.

One principal object of the invention is to provide such a fluid pressure actuated chuck, which will be extremely simple and compact in construction and at the same time be positive and accurate in operation. A further object is to provide a chuck of the type in question which may be readily mounted in any standard drill press or like machine in which chucks are regularly used, with provision for operating the chuck by hand or foot operated valve located wherever most convenient.

To the accomplishment of the foregoing and related ends, said invention then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
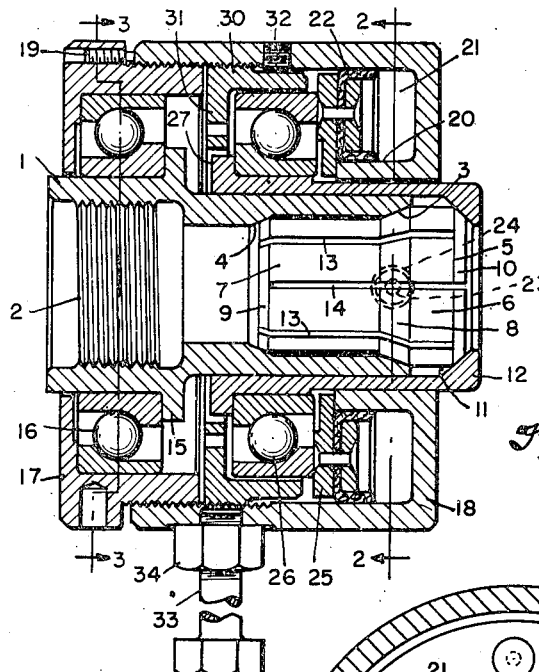
Fig. 1 is a central longitudinal section through a chuck embodying my present improvements.
Figure 2:
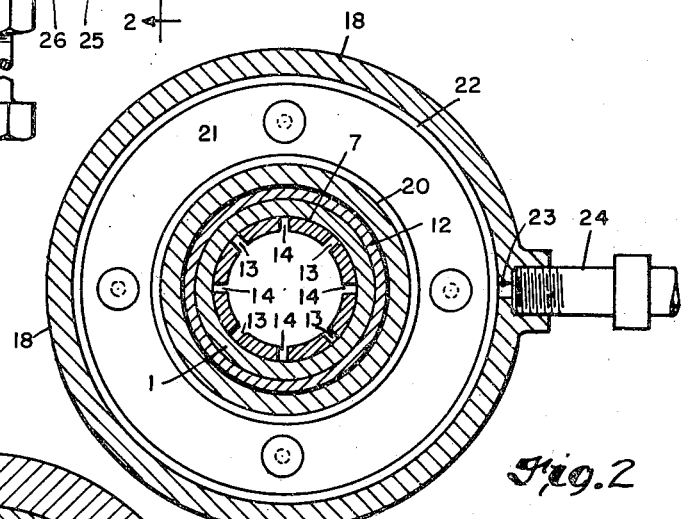
Fig. 2 is a transverse section thereof taken on the plane indicated by the line 2—2, Fig. 1.
Figure 3:
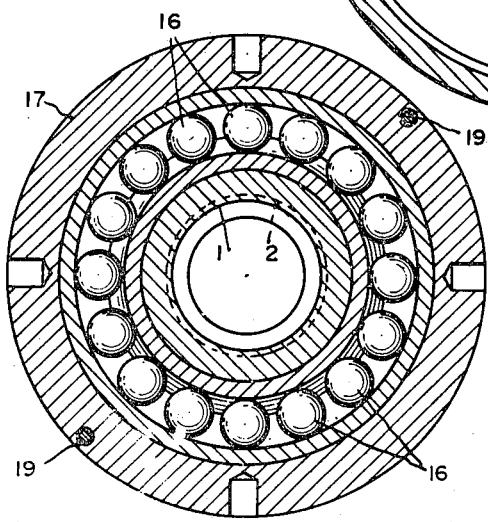
Fig. 3 is a similar transverse section taken on the plane indicated by the line 3—3, Fig. 1.

It should be noted that in the case of the chuck thus illustrated in the several figures of the drawing, the construction of the collet and the parts immediately associated therewith for contracting such collet is substantially the same as that set forth in U. S. Patent No. 2,228,685 issued to one of the applicants, viz., M. L. Benjamin, under date of Jan. 14, 1941. It will be understood, of course, that the means herein shown and described for effecting such actuation may be utilized, although not so advantageously, with other forms of collet.

Referring now to the construction as illustrated in the several figures of the drawing, the main element of the chuck comprises a hollow cylindrical member or sleeve 1, this corresponding in general with the forward hollow portion of the so-called "shank member" of the chuck set forth in the above-identified patent. While as shown, said member 1 is provided at its rear end with internal threads 2 whereby it may be mounted on a correspondingly externally threaded spindle (not shown), it will be understood that such end of the member may equally well consist of a shank suitable for connection to a socketed driving member.

The interior wall or bore of member 1 lying forwardly of such threaded rear portion 2 is formed with two substantially parallel axially spaced conical surfaces 3 and 4, which flare outwardly, i. e. toward the forward end of the member, the first such surface being in fact directly contiguous to such end. The collet 5 which is mounted within the portion of member 1 just described is formed externally with two axially spaced cylindrical surfaces 6 and 7 which are joined by a conical surface 8 complementary to and designed to co-act with conical surface 3 of member 1 and with the conical surface 9 at its inner end complementary to and designed to co-act with conical surface 4 on said member. In other words, said conical faces 8 and 9 are parallel and are inclined at the same angle and spaced substantially the same distance apart as the internal conical faces of the member 4. In addition, the collet at its forward end is provided with a conical face 10 which inclines at an angle opposite to that of the previously described conical faces and is adapted to be engaged by an inwardly directed conical face 11 on a nosepiece 12. Finally, it should be noted that the collet is longitudinally intersected by slots 13 and 14 which extend alternately from opposite ends thereof almost to the other end, so that upon relative axial movement of member 1 and nosepiece 12, the collet will be contracted and thus cause to grip the stem or shank of a tool inserted within the same or similarly to grip a workpiece, if desired. It will be understood that the collet will be made of tempered steel or equivalent metal, so that upon such contracting pressure being released, it will expand and resume its normal shape or diameter. The camming action of the several complementary conical faces will be such as to cause such contraction to be substantially uniform throughout the length of the collet without any longitudinal distortion of any section thereof.

For the purpose of reciprocating the nosepiece 12 so as to effect contraction of the collet 5, as just set forth, the means now to be described are provided.

Mounted externally on the rear end of member 1 so as to abut an outwardly directed flange or shoulder 15 thereon is the inner race-way of a ball bearing 16, the outer race-way of which is held in the one part 17 of a two-part casing, the other part 18 of which extends forwardly over nosepiece 12. The one part of such casing, part 18 as shown, overlaps the other part and has threaded engagement therewith so that the two parts may be adjusted axially relatively to each other, set screws 19 being provided to lock them together in adjusted position and thus form in effect a unitary structure.

The forwardly extending part 18 of such housing is formed with an inwardly directed flange 20 that encircles the adjacent portion of nosepiece 12 and forms an annular chamber 21 in which is received a corresponding annular piston 22. An opening 23 in the side wall of the casing part provides connection through a pipe or duct 24 with an exterior source of fluid pressure, e. g. compressed air, the supply of which to chamber 21 may be controlled in any suitable way, e. g. by a hand or foot operated valve (not shown).

Piston 22 is carried by an annular plate or ring 25 that is adapted to engage one side of the outer race-way of a second ball bearing 26, the opposite side of the inner race-way of said bearing having engagement with an outwardly directed flange or shoulder 27 on the adjacent inner end of nosepiece 12. The race-ways of said ball bearing 26 are so formed that when fluid pressure is supplied to the annular cylinder 21 and thereby actuate piston 22 throughout the attached annular plate 25 to insert pressure against the outer race-way, the thrust will be transmitted to the inner race-way and thus to such flange or shoulder on nosepiece 12 so as to draw the latter inwardly, i. e. to the left as viewed in Fig. 1. As previously explained, movement of the nosepiece in the direction referred to serves to contract the collet 5. On the other hand, upon releasing the pressure in the cylinder, the resiliency of the collet causes it to expand and thus move the nosepiece in the opposite direction whereby a reverse movement of the bearing with its races occurs and the piston is restored to its initial position.

The races of ball bearing 16 will desirably be oppositely disposed to those of ball bearing 26 since the thrust between casing part 17 and the outwardly directed flange or shoulder 15 on member 1 will be in the opposite direction.

Interposed between ball bearing 26 and the casing part 17 just referred to is a longitudinally adjustable ring 30, such adjustment being conveniently provided for by threaded engagement of such ring with the internal threads on casing part 18 whereby the latter is secured to casing part 17. Said ring carries an inwardly directed flange 31 which serves as a stop to limit the inward movement of the nosepiece when actuated as described above by the admission of pressure fluid to the annular cylinder 21. A set screw 32 in the wall of casing part 18 is adapted to engage ring 30 and secure the same in such adjusted position. Said casing part will also be desirably provided with means whereby when the chuck is secured in the machine, it will be held against rotation. Such means, as illustrated, may take the form of a radially extending rod or bolt 33 that is likewise threaded in the wall of casing part 18, being secured in place by means of a lock nut 34.

From the foregoing description of the construction and operation of the several component parts of my improved chuck, the operation of the chuck as a whole will be readily apparent.

When the chuck is set up for operation for use in a machine, it is only necessary to insert the tool or other part to be held therein, admit pressure fluid to the supply line 24, release such pressure and remove the tool or part. At the same time that operation of the chuck is thus facilitated, I retain all of the advantageous features of the collet construction set forth in the previously cited patent. Not only may the chuck be utilized to hold a tool or individual workpiece, but due to its construction, it is adapted equally for the handling of a continuous workpiece since such may be fed intermittently through the hollow interior of the chuck so as to present successive sections to a working tool in the machine equipped with such chuck.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a chuck, the combination of a hollow cylindrical supporting member formed with a radially outwardly projecting flange between its rear and outer ends, a contractible collet reciprocably mounted in the outer end of said member, said member and collet being formed with coacting faces whereby the latter is contracted upon movement thereof inwardly of the former, a nosepiece surrounding said member and provided with an inturned flange engaging the outer end of said collet and with a radially outwardly projecting flange spaced from and opposed to the flange on said member, a cylindrical casing surrounding said member and nosepiece and provided with inturned flanges straddling the radially outwardly projecting flanges on said member and nosepiece, said casing comprising a pair of casing members threaded together, means for locking said casing members against rotation relative to one another, a bearing engaged between the flange on said supporting member and that flange on said casing which is rearward of the flange on said supporting member, said casing being formed with an axial flange projecting rearwardly toward the radially outwardly projecting flange on said nosepiece from that flange on said casing which is outward of the flange on said nosepiece whereby to define an annular chamber in said casing surrounding said nosepiece, an annular piston reciprocable axially in such chamber, another bearing engaged between said piston and the radially outwardly projecting flange on said nosepiece, and means for admitting fluid under pressure into such chamber to thus move said piston relative to said casing and through said another bearing urge said nosepiece and thus said collet inwardly of said supporting member.

2. In a chuck, the combination of a hollow cylindrical supporting member formed with a radially outwardly projecting flange between its rear and outer ends, a contractible collet reciprocably mounted in the outer end of said member, said member and collet being formed with coacting faces whereby the latter is contracted upon movement thereof inwardly of the former, a nosepiece surrounding said member and provided with an inturned flange engaging the outer end of said collet and with a radially outwardly projecting flange spaced from and opposed to the flange on said member, a cylindrical casing surrounding said member and nosepiece and provided with inturned flanges straddling the radially outwardly projecting flanges on said member and nosepiece, said casing comprising a pair of casing members threaded together, means for locking said casing members against rotation relative to one another, a bearing engaged between the flange on said supporting member and that flange on said casing which is rearward of the flange on said supporting member, said casing being formed with an axial flange projecting rearwardly toward the radially outwardly projecting flange on said nosepiece from that flange on said casing which is outward of the flange on said nosepiece whereby to define an annular chamber in said casing surrounding said nosepiece, an annular piston reciprocable axially in such chamber, another bearing engaged between said piston and the radially outwardly projecting flange on said nosepiece, and means for admitting fluid under pressure into such chamber to thus move said piston relative to said casing and through said another bearing urged said nosepiece and thus said collet inwardly of said supporting member, said collet upon release of fluid under pressure from such chamber being operative to move outwardly of said supporting member and thereby move said nosepiece, another bearing, and piston outwardly, and adjustable plural stop means in said casing respectively operative to arrest inward movement of said piston by fluid under pressure and to arrest outward movement of said piston by said collet.

MILTON L. BENJAMIN.
FRANKLYN E. WINNEN.

REFERENCES CITED

The following references are of record in the file of this patent:

UNITED STATES PATENTS

| Number | Name | Date |
|---|---|---|
| 2,228,685 | Benjamin | Jan. 14, 1941 |
| 2,338,060 | Redmer | Dec. 28, 1943 |
| 2,345,069 | Phillips | Mar. 28, 1944 |
| 2,383,094 | Walder | Aug. 21, 1945 |
| 2,392,999 | Redmer | Jan. 15, 1946 |
| 2,393,458 | Cook | Jan. 22, 1946 |

FOREIGN PATENTS

| Number | Country | Date |
|---|---|---|
| 623,665 | Germany | Nov. 8, 1931 |
| 391,295 | Great Britain | Apr. 27, 1933 |